United States Patent
Marshall

(10) Patent No.: US 6,655,319 B2
(45) Date of Patent: *Dec. 2, 2003

(54) APPARATUS FOR DETERRING ANIMALS FROM AVIAN ENCLOSURES

(75) Inventor: Patrick Thomas Marshall, Tipp City, OH (US)

(73) Assignee: BirdQuest, LLC, Tipp City, OH (US)

( * ) Notice: Subject to any disclaimer, the term of this patent is extended or adjusted under 35 U.S.C. 154(b) by 188 days.

This patent is subject to a terminal disclaimer.

(21) Appl. No.: 09/900,807

(22) Filed: Jul. 6, 2001

(65) Prior Publication Data

US 2002/0195062 A1 Dec. 26, 2002

Related U.S. Application Data

(63) Continuation of application No. 09/480,936, filed on Jan. 11, 2000, now Pat. No. 6,363,891.
(60) Provisional application No. 60/164,451, filed on Nov. 10, 1999.

(51) Int. Cl.$^7$ .............................................. A01K 39/00
(52) U.S. Cl. ....................... 119/428; 119/57.8
(58) Field of Search ................. 119/428, 429, 119/433, 435, 459, 14.04, 57.9, 57.2, 52.3, 52.4, 57.8

(56) References Cited

U.S. PATENT DOCUMENTS

| | | | | |
|---|---|---|---|---|
| 5,868,101 A | * | 2/1999 | Marshall | ...................... 119/428 |
| D407,173 S | | 3/1999 | Marshall | |
| 6,119,627 A | * | 9/2000 | Banyas et al. | ............. 119/57.9 |
| 6,213,054 B1 | | 4/2001 | Marshall | |
| 6,363,891 B1 | * | 4/2002 | Marshall | ...................... 119/719 |

OTHER PUBLICATIONS

Droll Yankees, Yankee Piper, Winter 1999–2000, 2 pages.

* cited by examiner

Primary Examiner—Thomas Price
(74) Attorney, Agent, or Firm—Martin & Associates, L.L.C.; Derek P. Martin

(57) ABSTRACT

An apparatus for deterring certain kinds of animals from birdfeeders and birdhouses consists of rotating such avian enclosures at a sufficient speed to deter the undesirable animal. An electronic baffle rotates the avian enclosures at variable speeds for which fast speeds are used to deter animals and slow speeds are used for better viewing of birds. A support suspends the baffle from a tree or mounts the baffle to a pole in the ground. An electronic circuit contained within the baffle senses the animal's presence and controls the speed of a motor that rotates the avian enclosures for a predetermined period of time. Optionally, remote control circuitry may be used in manually deterring animals from the avian enclosures and for better viewing of birds.

41 Claims, 9 Drawing Sheets

APPARATUS FOR DETERRING ANIMALS FROM AVIAN ENCLOSURES

CROSS REFERENCE TO RELATED APPLICATIONS

This application claims the benefit of, and is a continuation of U.S. patent application Ser. No. 09/480,936 filed Jan. 11, 2000 now U.S. Pat. No. 6,363,891 entitled METHOD FOR DETERRING ANIMALS FROM AVIAN ENCLOSURES, and further claims the benefit of U.S. Provisional Application No. 60/164,451, Filed Nov. 10, 1999, both of which are incorporated herein by reference.

BACKGROUND OF INVENTION

1. Field of the Invention

The present invention generally relates to avian enclosures and accessories to avian enclosures. More specifically, the invention is directed at an externally separate device that rotates avian enclosures or a device that is part of the whole rotating avian enclosure.

2. Description of Prior Art

One of main purposes of avian enclosures for their owners is the enjoyment of watching birds. Unfortunately, rodents consume large quantities of birdseed and/or, worst yet, destroy birdfeeders and birdhouses due to their aggressive nature. The most vulnerable feeders are the ones made out of plastic or wooden parts of which squirrels will eventually chew on and destroy. As a result, people cannot enjoy watching birds at the same time while worrying about squirrels, or other rodents, damaging and/or scaring away birds from their feeders or houses.

Many attempts have been made in the prior art to develop, either internal or external to the birdfeeder, mechanisms that try to actively protect feeders by repelling rodents. Most of these use a cruel and inhumane electrical shock on the squirrels. For example, the Boaz U.S. Pat. No. 5,191,857 patent uses a large umbrella-shaped electrical shocking squirrel guard above the feeder. However, squirrels can get around this device simply by leaping onto the feeder from a nearby tree or from the ground. Other attempts shown by the patents to Doubleday et al. U.S. Pat. No. 2,856,898, Boyd U.S. Pat. No. 5,937,788, and Collins U.S. Pat. No. 5,471,951 all incorporate the electrical-shocking device within the feeder itself. However, defense mechanisms of these types are all eventually figured-out by the squirrels who are both cunning and very determined. Over time, the squirrels train themselves where to step and where not to step in order to avoid getting shocked.

Other attempts in the prior art have tried more passive devices such as plastic baffles for deterring squirrels that are inherently designed to be very large and bulky devices. For example, patents issued to Blasbalg U.S. Pat. No. 4,327,669, Nylen U.S. Pat. No. 5,642,687, and Chester U.S. Pat. No. 4,031,856 all use some sort of large umbrella-shaped squirrel guard located either above and/or below the feeder. However, the effectiveness of these passive devices is even worse than the previously mentioned active devices since the squirrel will not only defeat the device, they will also destroy the device in the process by chewing on it repeatedly.

SUMMARY OF THE INVENTION

The present invention is a new apparatus and method directed at deterring certain kinds of animals from avian enclosures by rotating the enclosures at sufficient speeds. As used herein, avian enclosure is intended to mean birdhouses, birdfeeders, and like structures intended for use by birds. An electronic baffle is described that safely deters unwanted animals such as rodents from the enclosures which includes a support for suspending the baffle, at least one animal sensing mechanism such as an electronic circuit that detects the presence of animals, and a motor/gearbox whose shaft is a hook that suspends the avian enclosures. The electronic baffle is also capable of rotating the suspended enclosures at a very slow speed. For example, this mode of operation is used for the purpose of eliminating blind spots from a birdwatcher's viewing area of the birds eating from the feeders.

It is another object of the present invention to provide an electro-mechanical rotating system which can be incorporated into various parts of avian enclosures in order to deter rodents, or other animals, from the enclosures by rotating the enclosures at a sufficiently fast speed.

It is another object of the present invention to provide an electro-mechanical rotating system that can be incorporated into various parts of avian enclosures in order to not scare birds from the enclosures by rotating the enclosures at a sufficiently slow speed.

It is another object of the present invention to provide an electro-mechanical rotating system that can be mounted into the ground using a pole from which the enclosures are attached.

It is another object of the present invention to provide an electro-mechanical rotating system that can be remotely-controlled using standard, off-the-shelve remote control technology incorporated into various parts of the invention.

Other objects and advantages of the present invention will become apparent from the following detailed description when viewed in conjunction with the accompanying drawings, which set forth certain, but not all-encompassing, embodiments of the invention.

DRAWING FIGURES

Figure 1:
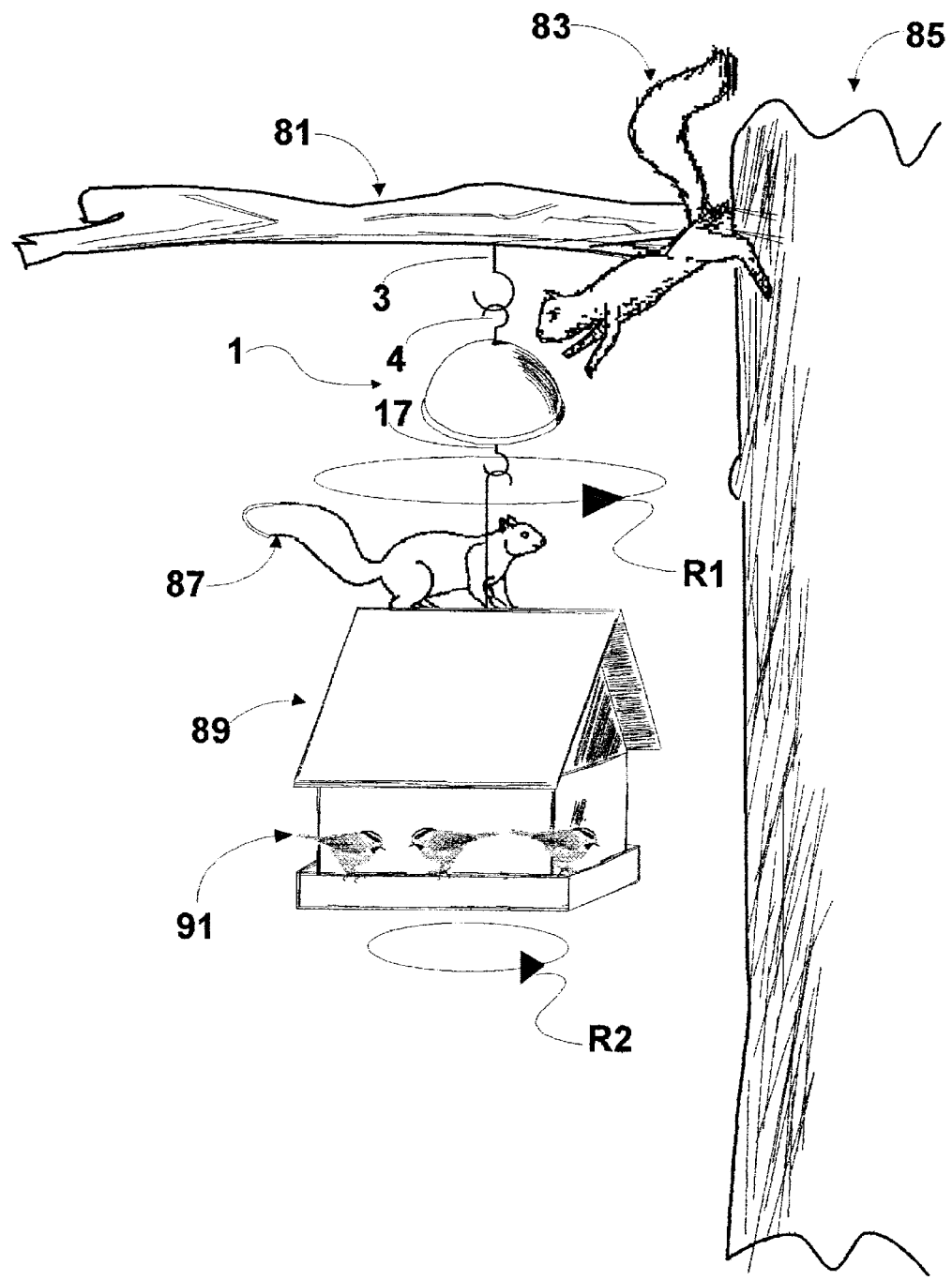
FIG. 1 illustrates a perspective view of the present invention as hung from a tree.

| LIST OF REFERENCE NUMERALS FOR DRAWING FIGURES | |
|---|---|
| 1 | hanging pest deterrent apparatus |
| 2 | post-mounted pest deterrent apparatus |
| 3 | mounting hook |

-continued

LIST OF REFERENCE NUMERALS FOR DRAWING FIGURES

| | |
|---|---|
| 4 | top hook |
| 5 | housing |
| 6 | electrical wires |
| 7 | printed circuit board mounting screws |
| 8 | printed circuit board |
| 9 | grommet |
| 10 | printed circuit board-to-hook small mounting screw |
| 11 | motor/gearbox |
| 12 | battery holders |
| 13 | base plate mounting screws |
| 14 | base plate |
| 15 | battery cover screws |
| 16 | on/off electrical switch |
| 17 | bottom hook |
| 18 | battery access doors |
| 19 | extended overhang |
| 20 | electronic switch mounting screws |
| 21 | motor/gearbox housing mounting screws |
| 26 | positive circuit terminals |
| 27 | chemical batteries |
| 28 | signal ground potential |
| 29 | load cell |
| 30 | positive input resistor |
| 31 | op-amp feedback resistor |
| 32 | power level sense capacitor |
| 33 | power level sense resistor |
| 34 | piezoelectric buzzer |
| 35 | transistor collector resistor |
| 37 | back-emf protection diode |
| 38 | N-channel Mosfet |
| 39 | vibration sensor NPN transistor |
| 40 | transistor biasing resistor |
| 41 | stabilization resistor |
| 42 | op-amp feedback capacitor |
| 43 | current limiting resistor |
| 44 | operational amplifier |
| 45 | stabilizing capacitor |
| 46 | negative input resistor |
| 47 | precision metal-film resistors |
| 48 | power switching NPN transistor |
| 49 | capacitor filter |
| 50 | reverse-battery protection diode |
| 51 | microcontroller |
| 52 | analog bridge circuit |
| 55 | starting step |
| 56 | power on step |
| 57 | power on status check |
| 58 | feeder off status check |
| 59 | greater than minimum threshold comparison step |
| 60 | short beep step |
| 61 | initialization step |
| 62 | measurement step |
| 63 | maximum threshold comparison step |
| 65 | between thresholds comparison step |
| 67 | less than minimum threshold comparison step |
| 68 | set feeder-off flag step |
| 69 | watch-dog-timer greater than N comparison step |
| 70 | calibrate all thresholds step |
| 71 | increment watch-dog-timer step |
| 72 | reset watch-dog-timer step |
| 73 | go to sleep step |
| 74 | watch-dog-timer or interrupt-went-off detection step |
| 75 | blocking capacitor |
| 78 | pole |
| 79 | earth |
| 81 | tree limb |
| 83 | top squirrel |
| 85 | tree |
| 87 | bottom squirrel |
| 89 | typical birdfeeder |
| 91 | birds |
| 100 | beeps |
| 102 | birdwatcher |
| 103 | radio frequency signals |
| 104 | infrared signals |
| 110 | input/output pin0 |
| 111 | input/output pin1 |

-continued

LIST OF REFERENCE NUMERALS FOR DRAWING FIGURES

| | |
|---|---|
| 112 | input/output pin2 |
| 113 | input/output pin3 |
| 114 | input/output pin4 |
| 115 | input/output pin5 |
| 120 | force-sensitive resistor |
| 122 | integrating capacitor |
| 150 | transmitter/receiver unit |
| 152 | load cell circuit |
| 154 | buzzer circuit |
| 158 | DIP switch |
| 159 | receiver/transmitter microcontroller |
| 160 | transmitter/receiver circuit |
| 162 | bi-directional transmission link |
| 164 | remote |
| 166 | remote buzzer |
| 168 | light emitting diodes |
| 170 | liquid crystal display circuit |
| 172 | keypad |
| 174 | serial port circuit 174 |
| 180 | remote DIP switch |
| 182 | remote microcontroller chip 182 |
| 184 | remote receiver/transmitter circuit |
| R1 | fast revolutions-per-minute speed |
| R2 | slow revolutions-per-minute speed |
| R | variable revolutions-per-minute speed |

DETAILED DESCRIPTION OF THE INVENTION

The detailed embodiments of the present invention are disclosed herein, however, it is to be understood that the disclosed embodiments are merely exemplary of the invention, which may be embodied in various forms of which some are detailed at close of this section. Therefore, the details disclosed herein are not to be interpreted as limited, but merely as the basis for the claims and as a basis for teaching one skilled in the art how to make and/or use the invention.

A method of deterring rodents, such as squirrels, from avian enclosures which consists of spinning the enclosures about their vertical axis will now be described. To accomplish this task, the rotating device must spin the feeder at a high enough revolutions-per-minute suitable to make the squirrel dizzy and/or nauseated. Through experimentation, a revolutions-per-minute of between 70 and 100 was found to make those squirrels that jump onto a feeder want to jump back off. Results so far have shown that, at these speeds, the squirrel becomes light-headed and/or agitated due to the sufficient centrifugal force generated from the rotating avian enclosure. Consequently, the squirrels always jump off after a brief period of time of usually less than 15 seconds. However, to be safe, the enclosure should be allowed to run at least one minute especially for battery-operated devices which may start to slow down after the batteries start to drain. In addition, it was found that squirrels will not try to board an already rotating feeder. So, as a result, an optimum system is one that senses the rodents prior to them jumping onto the feeder. The feeders can then be activated before the rodent even has a chance to eat any food.

The devices chosen to accomplish this method should also be flexible enough to rotate the enclosures at very slow speeds. This is necessary for when birds land to allow the birdwatcher to see all sides of their enclosure. The rotational speed has to be slow enough to not scare away the birds. Through experimentation, it was found that a rotational speed of less than about six revolutions-per-minute will usually suffice in not scaring off any birds perched on the rotating feeder. However the revolutions-per-minute speed should not be too low as to become almost boring to watch. As a result, it was determined that about a three revolutions-per-minute is a safe and yet interesting rotational speed.

The electrical and/or mechanical rotating device ultimately chosen for this invention should take some or all of the above specifications into account. Also for the convenience of the user, the device should be made as automated as possible. For example, the device should have the capability to sense when the rodents or birds are on the feeder and discriminate between the two in order to decide whether to rotate the feeder fast or slow. Also for the convenience of the user, the device can have a remote-control capability that notifies the birdwatcher when something is in their feeder. The birdwatcher should then have the flexibility to decide what to do next to, for example, rotate the feeder to a variably fast speed or activate a very loud buzzer. Lastly, since some rodents are very smart, the device, if it is hanging from a tree, should also have the capability to sense when a rodent is trying to climb down from above. Some possible electrical/mechanical apparatuses that meet the above specifications of the invention will now be described in detail.

Referring to FIG. 1 where a preferred embodiment of the invention, a hanging pest deterrent apparatus 1, is shown having a top hook 4 being suspended by a mounting hook 3 which is attached to suitable support such as a tree limb 81 which is part of a larger tree 85. A typical birdfeeder 89 is then hung from a bottom hook 17 attached to the hanging apparatus 1. Alternately the feeder 89 could have been replaced by a birdhouse (not shown). When a single or plurality of birds 91 lands on the feeder 89, the mechanical vibrations and changes in weight of the feeder 89 will be sensed by electronics contained within the hanging apparatus 1. The electronics will then activate a motor/gearbox (not shown) whose shaft is attached to the bottom hook 17 which will then, in turn, rotate the feeder 89 at a sufficiently slow revolutions-per-minute speed R2 as to not startle the birds 91. The electronics contained within the hanging apparatus 1 can also detect when a larger animal, such as a bottom squirrel 87, jumps onto the feeder 89. The hanging apparatus 1 will then rotate the feeder around in a circular fashion at a fast revolutions-per-minute speed R1 sufficient to make the bottom squirrel uncomfortable and jump back off the feeder 89. In another attempt, a top squirrel 83 climbs down onto the feeder 89 from above. However, he has to first apply his own body weight to the hanging apparatus 1. Electronics contained within the hanging apparatus 1 will again detect the force being applied to hanging apparatus's 1 outer shell and start to turn the feeder 89 at the fast speed R1. The top squirrel 83 will then be startled and not want to jump onto a rotating feeder 89 and simply leave in frustration.

Figure 2:
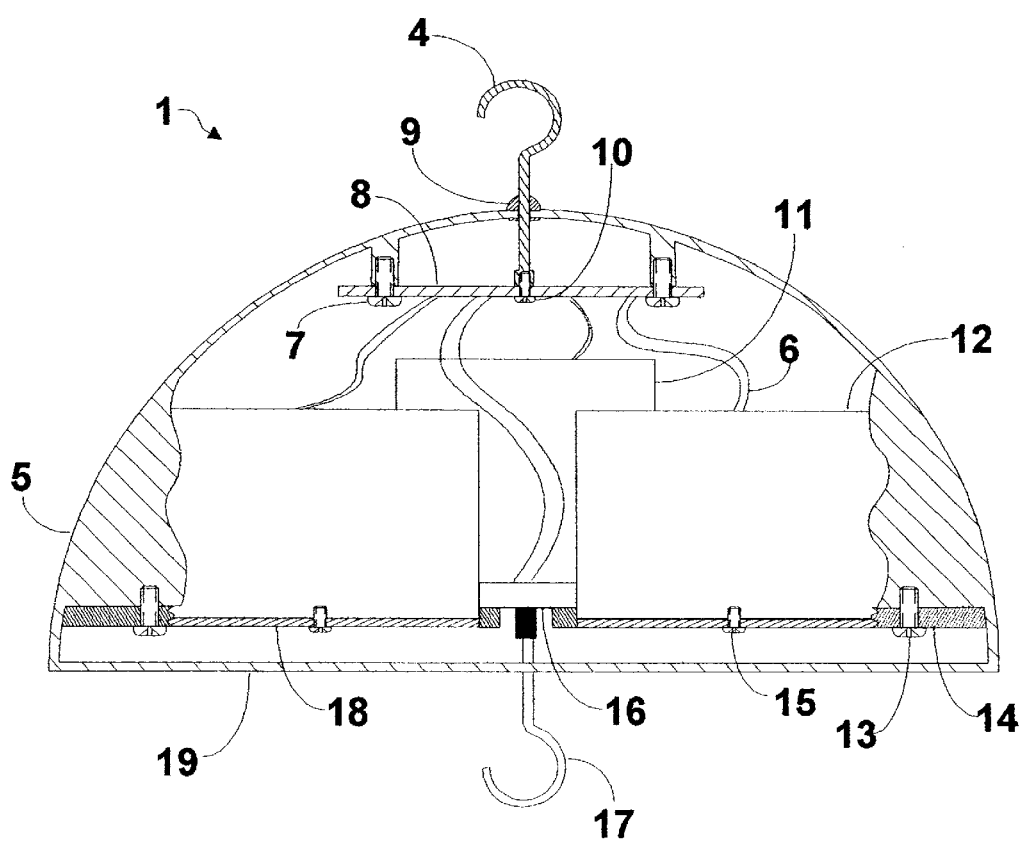
FIG. 2 is a cutaway cross-sectional side view of the present invention.

Refer now to FIG. 2 which illustrates is a cutaway cross-sectional side view of the hanging apparatus 1. The top hook 4 is shown attached to a printed circuit board 8 that is populated with the electronics (not shown). The top hook 4 must be made of a suitably strong metal to be able to support not only the hanging apparatus's 1 own weight, but also the weight of a large feeder completely filled with birdseed (not shown). The top hook 4 must also be strong enough to sustain the weight of the largest rodents (not shown) found here in the United States and abroad. Further, since the hanging apparatus 1 is to be used outdoors, the top hook 4 must never be allowed to rust. Accordingly, a metal like stainless steel may be a suitable choice to use for the top hook 4. The top hook is connected to the printed circuit board 8 by using a printed circuit board-to-hook small mounting screw 10. This small screw 10 can be a machine screw made of suitably strong metal to again support a wide range of loads. The small screw 10 must also be large enough to support a wide range of loads and yet small enough to allow the printed circuit board 8 to flex along its vertical axis due to varying loads. Likewise, the printed circuit board 8 must be made of suitably strong material such as fiberglass. The printed circuit board 8 must also be thick enough to again support a wide range of loads and yet be thin enough to allow flexation along its vertical axis due to varying loads.

The printed circuit board 8 is also shown in FIG. 2 attached to a housing 5 through the use of a couple of printed circuit board mounting screws 7. The diameter of the housing 5 must be made sufficiently large to force top squirrels 83, shown in FIG. 1, to apply their own body weight to the housing 5 when stretching around the outside of the housing 5. The housing 5 can be injection molded using a plastic material such as a black acrylonitrile-butadiene-styrene or equivalent that is very durable outdoors and whose color will not fade over time. Furthermore, to prevent hardening and cracking over time, an ultraviolet stabilized curing agent should also be used in the manufacturing process of the housing 5. The printed circuit board mounting screws 7 must be made of suitable metal to support a wide range of loads. Also, their location must be set far enough away from the small screw 10 to allow the printed circuit board 8 to flex along its vertical axis due to varying loads. However, the vertical flexation of the printed circuit board 8 must never be allowed to exceed beyond its mechanical limits. For safety reasons, mechanical stops (not shown) may have to be employed to prevent the printed circuit board 8 from flexing beyond its maximum limits.

Shown also in FIG. 2 is a grommet 9 that is press-fitted into a hole at the top center of the housing 5 making a tight seal against the housing 5 and top hook 4 for preventing moisture from seeping into the hanging apparatus 1. This grommet 9 must be made of a elastic rubber or plastic or silicon rubber which will allow the surrounding housing 5 to flex with varying loads. Furthermore, the grommet must also be durable enough to never degrade or harden over time from extreme outdoor environments. Consequently an ultraviolet stabilized curing agent should be used in the manufacturing process of the grommet 9. In addition, the housing 5 is also shown having an extended overhang 19 to help protect all components, connected to a base plate 14, from rain, dust, sand, and snow. The base plate 14 is connected to the housing 5 using a multitude of base plate mounting screws 13. The overhang 19, which is part of the housing 5, should extend beyond the most protruding part not including the bottom hook 17 which is connected a motor/gearbox's 11 shaft. For safety reasons, the bottom hook 17 must be securely attached to the motor/gearbox 11 for handling the largest of anticipated loads. Furthermore, the bottom hook 17 must be made of a suitably strong metal to be able to support a large feeder completely filled with birdseed (not shown). The bottom hook 17 must also be strong enough to sustain the weight of the largest rodents (not shown) found here in the United States and abroad. Further, since the hanging apparatus 1 is to be used outdoors, the bottom hook 17 must never be allowed to rust. Accordingly, a metal such as stainless steel may be a suitable choice to use for the bottom hook 17. Also shown in FIG. 2 are a plurality of electrical wires 6 which are electrically connected from the printed circuit board 8 to the motor/gearbox's 11 housing. The wires 6 are also connected to a plurality of battery holders 12 and an on/off electrical switch 16. The wires 6 must be made of a suitable gauge wire to allow sufficient current to flow between the printed circuit board 8 and the aforementioned electrically connected components. Preferably, the battery holders 12 should be plastic-injection molded as part of either the housing 5 or the base plate 14. In addition, the weight distribution of the batteries (not shown) is such that the center of gravity must be maintained along the vertical axis of the device. As a result, the battery holders 12 must be place at equal-distances for each other and from the vertical axis through the center of the device. A plurality of battery access doors 18 are attached to the battery holders 12. Hinges (not shown) are used connect the doors 18 to the base plate 14. When closed, the doors 18 are secured to the base plate 14 using a plurality of battery cover screws 15.

Figure 3:
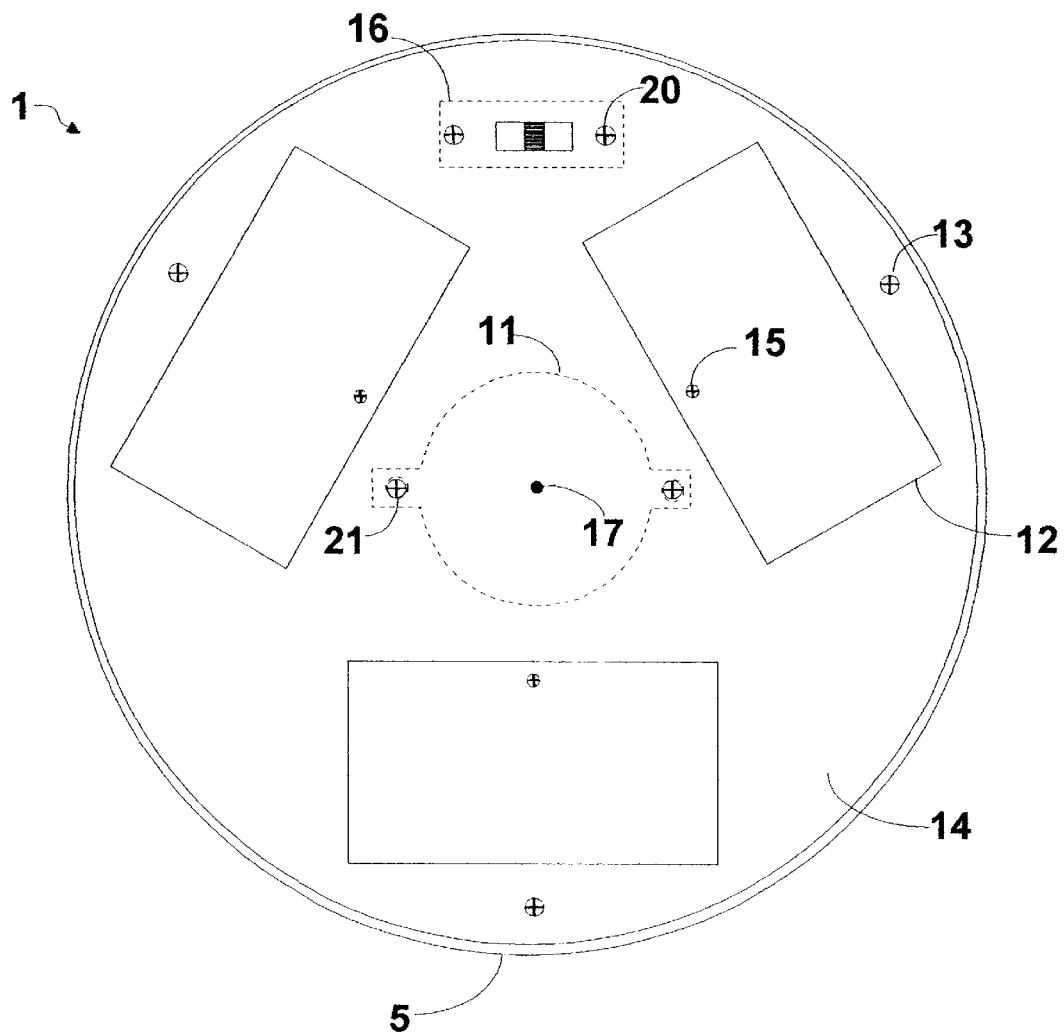
FIG. 3 is a bottom view of the present invention.

FIG 3 illustrates a bottom view of the hanging apparatus 1. As can be seen, a pair of electronic switch mounting screws 20 are used to secure the switch 16 to the base plate 14. The switch 16 is mounted towards the outside edges of the base plate 14 allowing easy access to turning the hanging apparatus either on or off. Also shown in the figure are a pair of motor/gearbox housing mounting screws 21 which are used to secure the motor/gearbox's 11 housing to the base plate 14. All cracks in the base plate 14 must be properly sealed with, for example, silicon rubber to prevent moisture from seeping into the hanging apparatus 1. Lastly, all aforementioned screws in both FIG. 2 and FIG. 3 must be made of a sufficiently strong metal such as stainless steel that also does not rust.

Figure 4:
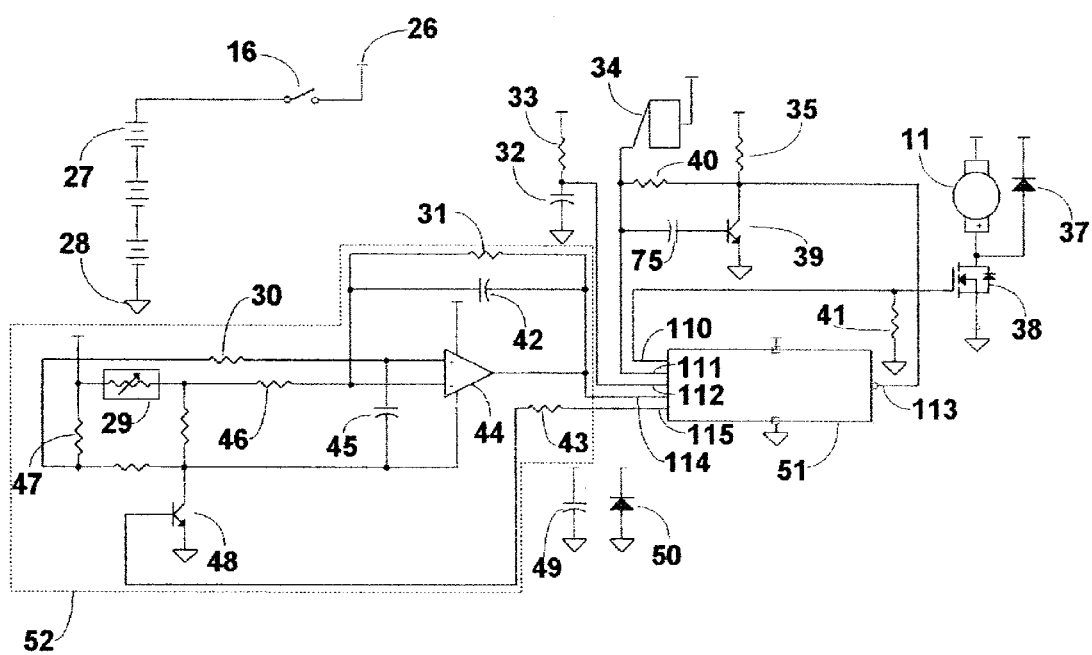
FIG. 4 is a schematic electronic diagram of the present invention.

Refer now to FIG. 4, which illustrates is a schematic electronic diagram of the electronics used in the present invention. A plurality of chemical batteries 27 are connected in series to boost the voltage potential. As shown, the voltage potential is boosted three fold. Power is applied to the circuit from the batteries 27 whenever the switch 16 is in the closed position. This action will complete the circuit from the positive terminal of the last battery 27 to a plurality of positive circuit terminals 26. Current can then flow from the positive circuit terminals 26 to the rest of the circuit, which is then returned to a signal ground potential 28. The force-to-electrical transducer circuit, which is comprised of an analog bridge circuit 52, is now ready to take weight measurements. To activate the bridge circuit 52, the base of a power switching NPN transistor 48 is pulled towards the positive circuit voltage potential 26. This action is controlled by an input/output pin5 115 of a microcontroller 51 through a current limiting resistor 43. The ground potential 28 is now applied to the bridge circuit 52 through the transistor 48 which must be capable of handling the current load. One of the first places that receives the newly activated current is the standard wheatstone passive bridge circuit which is comprised of a load cell 29 and a plurality of precision metal-film resistors 47. The location of the load cell 29 is crucial since it must be located as close as possible to the maximum flexation point of the printed circuit board 8 in FIG 2. This point is located on the bottom side of the printed circuit board 8 close to the small screw 10 in FIG 2 at which the load cell 29 is bonded using a suitable cement such as Duco, Eastman 910, or EPY-150. The load cell 29 is oriented with its active length aligned with the sensing axis. It is important to obtain load cells 29 that have a temperature coefficient close to the metal, which is copper in this case, that the load cell 29 is bonded to. To conserve battery 27 power, it is also important that the load cell 29 and precision resistors 47 all have reasonably high resistance values. Alternately, a quad-load cell (not shown) could have been used that would replace the present load cell 29 and the precision metal-film resistors 47. Ideally the quad-load cell could be manufactured right on the printed circuit board 8 in FIG 2 using standard laser-trimming techniques.

A positive input resistor 30 and a negative input resistor 46 connect the differential bridge circuit to the input terminals of an operational amplifier 44. The amplifier 44 is configured as a differential circuit that subtracts the voltage differences between its positive and negative terminals. Furthermore, the amplifier 44 circuit is also configured as an integrating amplifier that combines the differential signals over time. An op-amp feedback resistor 31 and an op-amp feedback capacitor 42 conduct the integration and amplification of the signals. A stabilizing capacitor 45 also helps in the integrating process performed by the operational amplifier 44. The output of the amplifier 44 is supplied to an input/output pin4 114 of the microcontroller 51 whose internal program will count how long it takes until a logic high voltage level is reached. The resultant count is a measure of the current load being applied to the load cell 29. All resistors contained within the bridge circuit 52 should have high tolerances to temperature fluctuations so at least 1% precision metal-film resistors should be used. The microcontroller 51 can be any suitable low-power microcontroller such as Microchip's PIC12C508A part.

A piezoelectric buzzer 34 is used as both a sounding device and a vibration sensor. When used as a sounding device, there are actually two purposes: (1) To notify the user of the current status of the system and (2) To help scare rodents away using either audio or ultrasonic signals. In both cases, an oscillatory signal is supplied to the buzzer 34 by the microcontroller 51 via an input/output pin 1111. When the buzzer 34 is configured as a sensor, the input/output pin 1111 must be reconfigured, by the program running internally to the microcontroller 51, as a high impedance output. In this case, the input/output pin1 111 is basically disconnected, signal-wise, from the rest of the circuit which is required when the buzzer 34 is to be used as a vibration sensor. The mechanical vibrations applied to the buzzer 34 are then converted to a voltage signal which is amplified by a vibration sensor NPN transistor 39. A transistor biasing resistor 40 is used to keep the vibration sensor NPN transistor's 39 sensitivity high while a transistor collector resistor 35 helps amplify the signals. The vibration sensitive voltage amplified signal is then supplied to an input/output pin3 113 of the microcontroller 51 which uses the signals to detect the presence of rodents and/or birds. Lastly, a blocking capacitor 75 is used to prevent activity at the input/output pin1 111 from causing an accidental interrupt at the input/output pin3 113.

An input/output pin0 110 is used to activate an N-channel mosfet 38 which, in turn, activates the motor/gearbox 11. A stabilization resistor 41 keeps any spurious noise from activating the mosfet 38 and a back-emf protection diode 37 protects the rest of the circuit from fast deactivations of the motor/gearbox 11. A power level sense capacitor 32 and a power level sense resistor 33 are both used by the microcontroller, via an input/output pin2 112, for measuring the current battery voltage level. The results from this measurement are then used to calculate the coefficients for the pulse-width modulation of the motor/gearbox 11. Also, these results are used to sound a certain number of beeps from the buzzer 34 when the batteries need to be changed. A capacitor filter 49 is used to help filer out any spurious noise and a reverse-battery protection diode 50 is used to help protect the rest of the circuit in FIG. 4 from accidental reverse polarity placement of the batteries 27.

Figure 5:
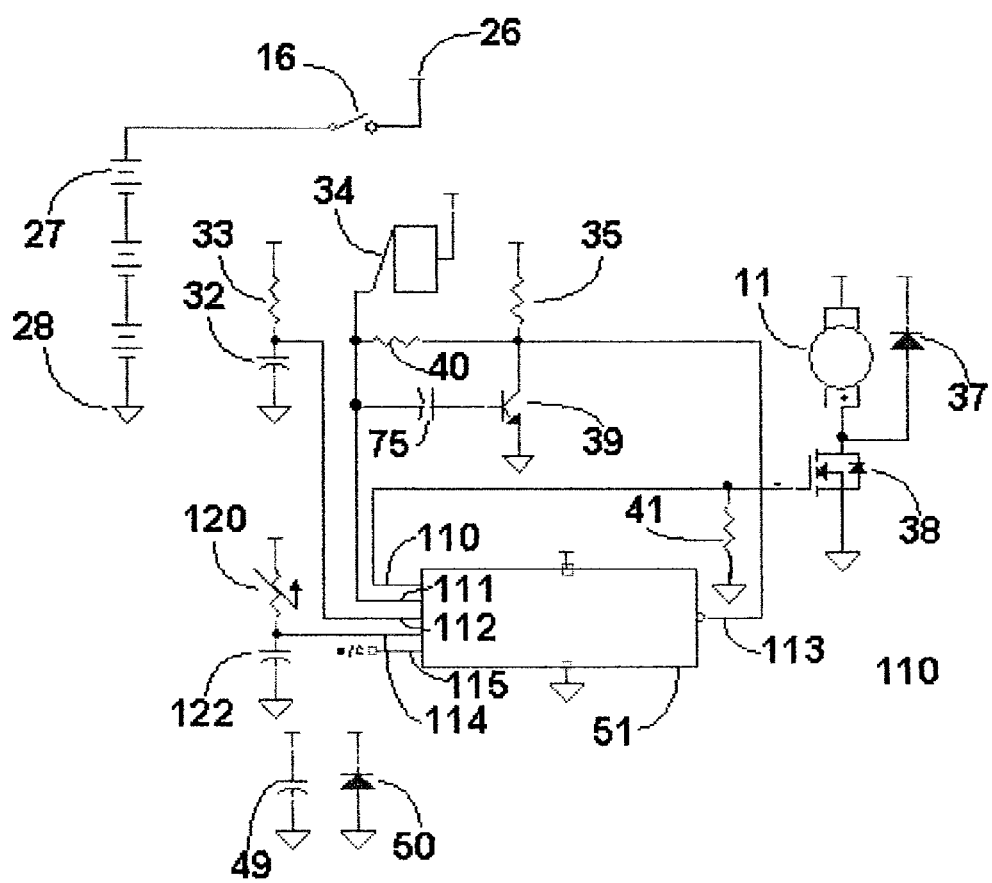
FIG. 5 is an alternate schematic electronic diagram of the present invention.

FIG. 5 is an alternate schematic electronic diagram of the present invention that is very similar to the circuit in FIG. 4 except the analog bridge circuit 52 in FIG. 4 is replaced with a force sensitive resistor 120 and an integrating capacitor 122. The microcontroller 51 discharges the integrating capacitor 122 via the input/output pin4 114 by pulsing the pin towards ground potential 28. The microcontroller 51 then reconfigures the input/output pin4 114 as an input and counts how long it takes until it sees a logic high voltage level. The resultant count is a function of the current value of the force sensitive resistor 120. As with the load cell 29 used in FIG. 4, the location of the force sensitive resistor 120 is crucial since it must be located as close as possible to the maximum flexation point of the printed circuit board 8 in FIG. 2. This point is located on the bottom side of the printed circuit board 8 close to the small screw 10 in FIG. 2 at which the force sensitive resistor 120 is bonded using a suitable cement. Alternately, the force sensitive resistor 120 could be manufactured right on the printed circuit board 8 in FIG. 1 using resistive ink during the a silk-screening process.

Figure 6:
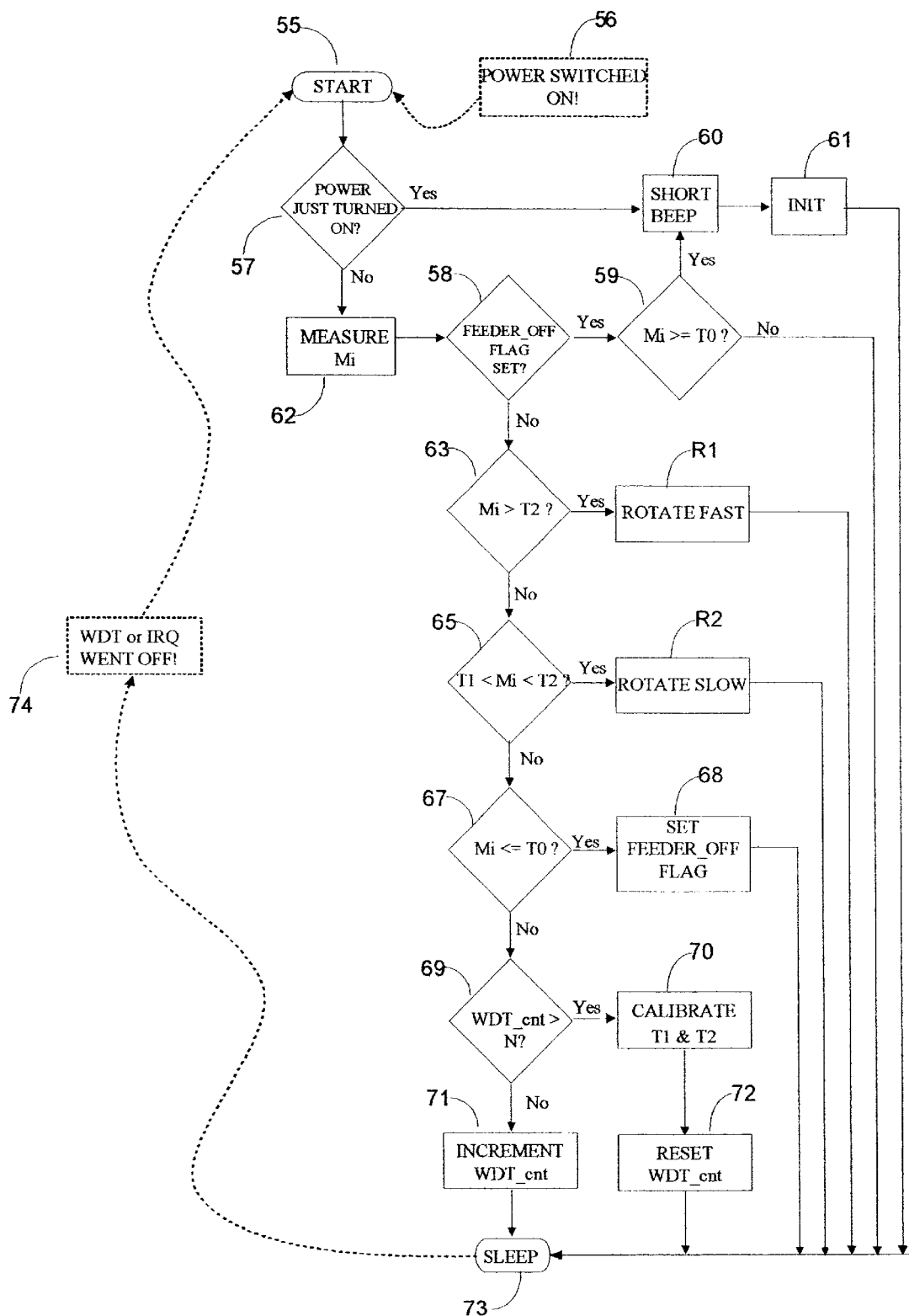
FIG. 6 is a simplified algorithmic block diagram of the invention.

Refer now to FIG. 6 that is a simplified algorithmic block diagram of the program that executes within the microcontroller 51 in FIG. 4 and FIG. 5. The algorithm starts after a power on step 56 is executed which is after the power is turned-on by the switch 16 in FIG. 4 and FIG. 5. A starting step 55 is then executed which goes on to a power on status step 57. The power on status step 57 determines whether the power was just turned on or not. If the answer is yes, then a short beep step 60 is executed next which notifies the user that the system is activated. An initialization step 61 is then executed that resets all internal variables and conducts other miscellaneous functions. A go to sleep step 73 is then executed which causes the microcontroller in FIG. 4 and FIG. 5 to go into a very low-power mode of operation. During this mode, only a watch-dog-timer or interrupt-went-off detection step 74 can make the algorithm return to the starting step 55. A watch-dog-timer is utilized to wake-up the algorithm after a predetermined amount of time has gone by. This conserves energy since power consumption is proportional to the amount of time that the system is not in the sleep mode 73. As a result, the longer the algorithm is asleep, the less power will be consumed averaged over time. When the watch-dog-timer does finally arrive, the starting step55 will then be executed. The watch-dog-timer or interrupt-went-off detection step 74 also has an external interrupt capability configured to wake up on a pin voltage level change. Namely, if the voltage level of one or more of the sensor input pins in FIG. 4 or FIG. 5 crosses over a logic threshold then the next step, the starting step55, will be executed. The power on status step 57 is then executed which determines whether the power was just turned on or not. In this case answer is no and the next step, a measurement step 62, is executed which computes the Mi count which is a function of the force that is currently being applied to the load cell 29 in FIG. 4 or the force sensitive resistor 120 in FIG. 5. The next step, a feeder off status check 58, is then executed which determines whether or not an internal feeder off flag variable (not shown) is set high or low. The internal feeder off flag is used to determine which step to execute next. If the flag is set high, a logic 1, then the next step, a greater than minimum threshold comparison step 59, is executed. This step compares the Mi value just measured to a factory-calibrated threshold called T0 that is equivalent to a no-load condition of the hanging apparatus 1 in FIG. 1. In other words, this threshold is proportional the hanging apparatus's 1 own weight with no feeder 89 attached in FIG. 1. If Mi is still less than T0 the algorithm goes back to sleep 73. If Mi is greater than or equal to T0 then the feeder 89 must have just been place back on the hanging apparatus 1 in FIG. 1. In this case the next step, the short beep step 60 is executed next which notifies the user that the system is still activated. The initialization step 61 is then executed and finally the sleep step 73 is executed.

When the algorithm finally gets back to the feeder off status check 58 step, it will now find the internal feeder off flag variable has been reset by the previous initialization step 61. As a result, a maximum threshold comparison step 63, is then executed which compares Mi to an internally calibrated threshold called T2. This threshold, T2, helps determines, whether on not, either the bottom squirrel 87 and/or the top squirrel 83 has been detected in FIG. 1. If Mi is greater than T2 then the answer is yes and the next step, the fast revolutions-per-minute speed R1 step, is executed which rotates the feeder 89 in FIG. 1 at a fast enough speed to make the rodents 83 and/or 87 dizzy or fly off. After a predetermined amount of time has gone by, the rotation of the feeder 89 in FIG. 1 is stopped and the sleep step 73 is then executed. However, if the answer to the maximum threshold comparison step 63 is no then the next step, a between thresholds comparison step 65, is executed which determines whether birds 91 are on the feeder 89 in FIG. 1. If Mi's value is between both T1 and T2 thresholds then the answer to the between thresholds comparison step 65 is yes and the next step, a slow revolutions-per-minute speed R2 step, is executed which rotates the feeder 89 at a slow enough speed to not scare away the birds 91 in FIG. 1. After a predetermined amount of time, the rotation of the feeder 89 in FIG. 1 is stopped and the next step, sleep 73, is then executed. If the answer to the between thresholds comparison step 65 is no than the next step, a less than minimum threshold comparison step 67, is executed which determines whether or not the measured value Mi is less than or equal to the factory-calibrated T0 threshold value. If the answer to this question is yes, the next step, a set feeder-off flag step 68, is executed which sets an internal feeder off flag to a logic high level. This step is executed whenever the feeder 89 has just been removed from the hanging apparatus 1 in FIG. 1 for cleaning and/or refilling. The next step, sleep 73, is then executed. If the answer to the minimum threshold comparison step 67 is no, the next step, a watch-dog-timer greater than N comparison step 69, is executed which compares the current watch-dog-timer count WDT_cnt to a predetermined set value N. If WDT_cnt is found to be greater than N then the next step, a calibrate all thresholds step 70, is then executed which calibrates the T1 and T2 thresholds. A reset watch-dog-timer step 72 is then executed which sets WDT_cnt to zero. The system then powers down in the sleep step 73. If the answer to the watch-dog-timer greater than N comparison step 69 is no then the next step, an increment watch-dog-timer step 71, is executed which simply increments the WDT_cnt variable. Finally the system goes back to sleep 73 in FIG. 6. Note that for this simplified algorithm in FIG. 6 to work properly, the T1 and T2 threshold variables must be initialized to their maximum possible values in the initialization step 61.

Figure 7:
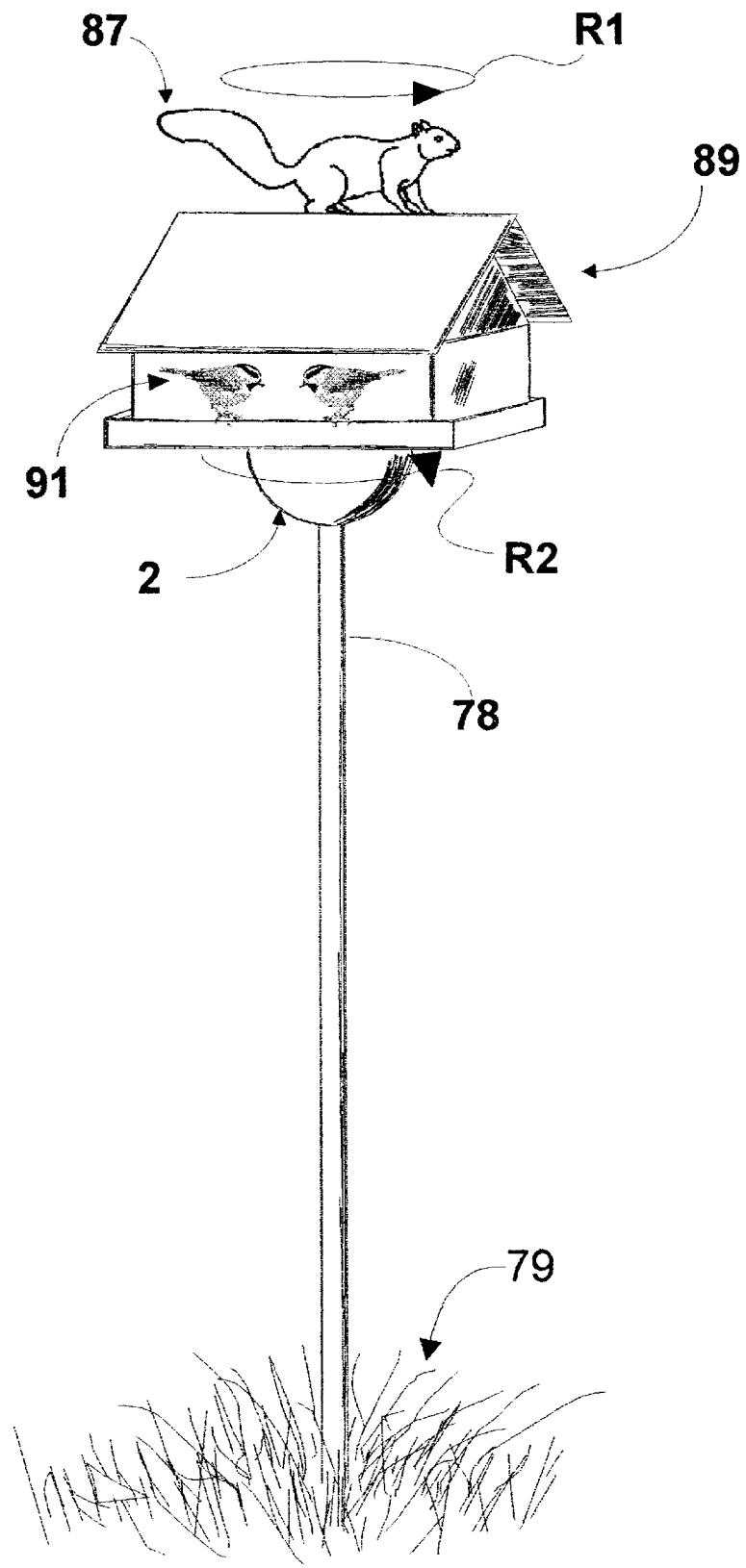
FIG. 7 illustrates a perspective view of an alternative version of the present invention shown mounted onto a pole.

Refer now to FIG. 7, which illustrates a perspective view of an alternative version of the present invention, shown mounted onto a pole 78. A pole-mounted pest deterrent apparatus 2 is shown attached to the top of the pole 78 whose other end is securely positioned into a typical earth 79. The birdfeeder 89 is then mounted to the pole-mounted apparatus 2. When the bottom squirrel 87 is detected, the pole-mounted apparatus 2 will start to rotate the feeder 89 sufficiently fast R1 to make the bottom squirrel 87 uncomfortable and want to jump off. Likewise, when the birds 91 are detected, the pole-mounted apparatus 2 will start to rotate the feeder 89 at sufficiently slow speeds R2 to make the birds 91 comfortable and not want to fly away. The mechanics and electronics for the pole-mounted apparatus 2 would be very similar to the hanging apparatus 1 shown in FIG. 1. Except now the hanging apparatus 1 from FIG. 1 is mounted upside down to the pole 78 in FIG. 7. Its top hook 4 in FIG. 1 would either be attached to or be replaced with a more suitable attachment for the pole 78 in FIG. 7. Likewise, the hanging apparatus 1 would have its bottom hook 17 in FIG. 1 either attached to or be replaced with a more suitable attachment for a turntable-like device (not shown). The feeder 89 would then be attached to this turntable.

Figure 8:
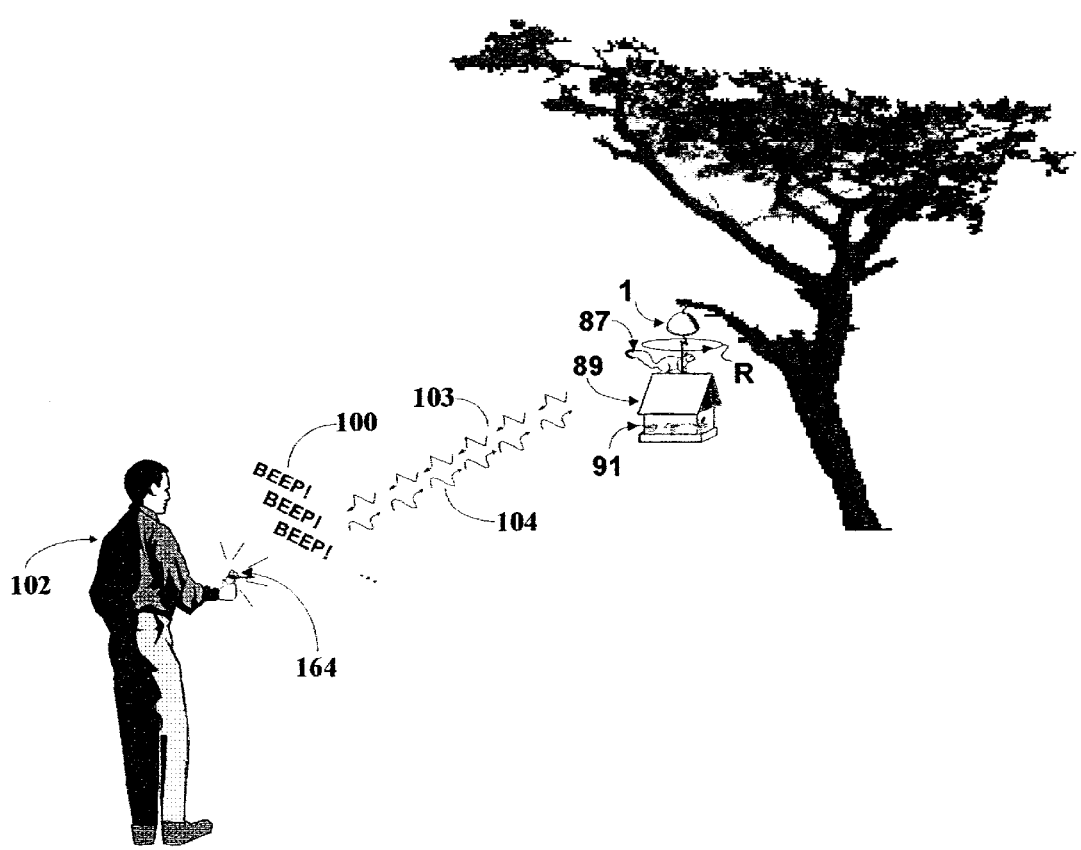
FIG. 8 illustrates a perspective view of a remote-control version of the present invention.

Refer now to FIG 8 that illustrates a perspective view of a remote-control version of the present invention. A birdwatcher 102 now has the added control of manually deciding what animals are allowed in their birdfeeder 89 or birdhouse. To accomplish this, the circuits in FIG. 4 and FIG. 5 are modified to include certain transmitter/receiver circuits. As a result, when a rodent 87 and/or birds 91 now lands on the feeder 89 in FIG. 8, a purality of non-directional radio frequency signals 103 are transmitted over the airwaves to a remote 164 held by the birdwatcher 102. The remote 164 would then process these radio frequency signals 103 and announce, using a plurality of audio beeps 100, to the birdwatcher 102 that something is on their feeder 89. The birdwatcher 102 then has the flexibility to decide if they want to rotate the feeder at a fast variable speed R making the rodent uncomfortable and want to jump off. Or the birdwatcher 102 could decide to rotate the birdfeeder 89 at a slow variable speed R turning the birdfeeder 89 until the birds 91 can be easily seen. In order to accomplish these tasks, the remote 164 would send, with the press of a button, a plurality of directional infrared signals 104 back to the hanging apparatus 1 in FIG 1 or the pole mounted apparatus 2 in FIG. 7.

Figure 9:
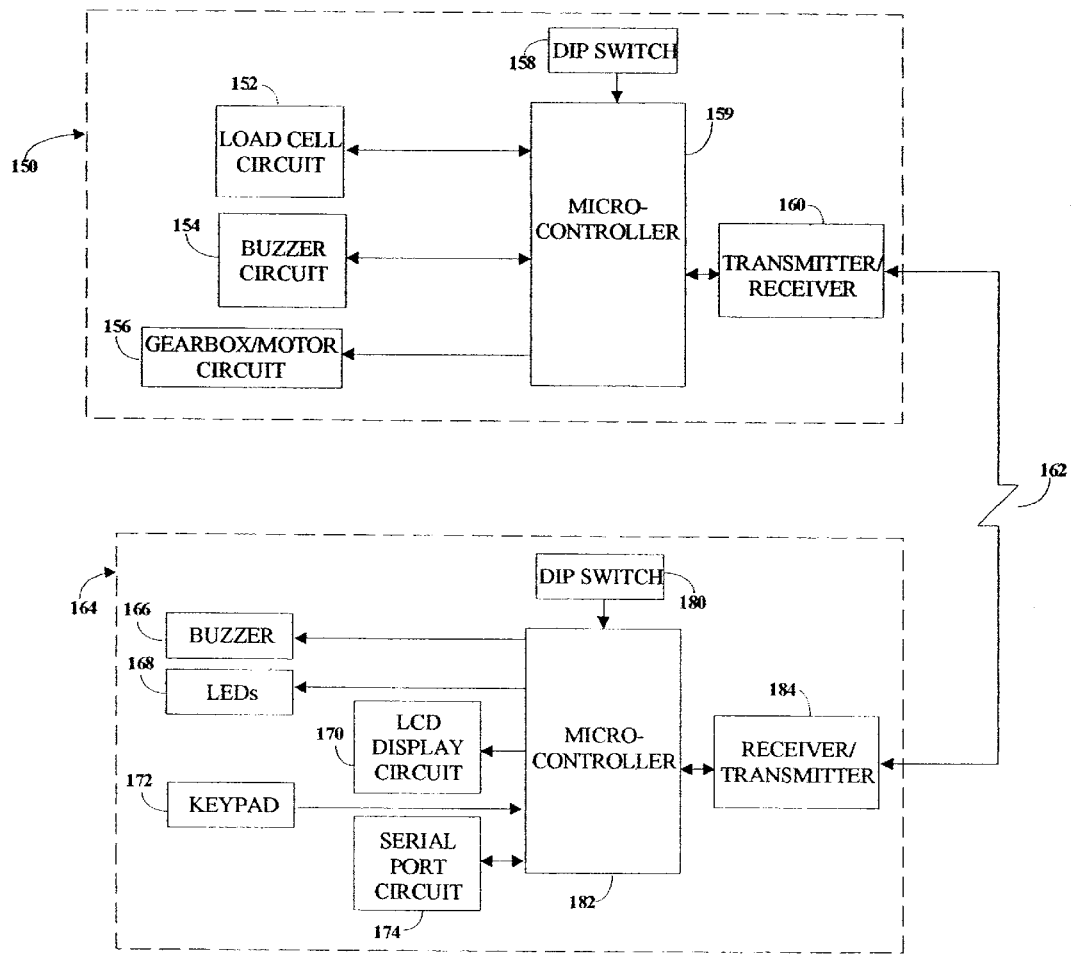
FIG. 9 is a simplified hardware block diagram of an alternative version of the present invention being remotely controlled.

Refer now to FIG. 9 that illustrates a simplified hardware block diagram of an alternative version of the present invention being remotely controlled. The circuits in FIG. 4 and FIG. 5 are modified to include a transmitter/receiver circuit 160. Consequently, a new transmitter/receiver unit 150 is installed, in place of the printed circuit board 8 in FIG. 4 and FIG. 5. This new circuit board would then be installed inside the hanging apparatus 1 in FIG. 1 or the pole-mounted apparatus 2 in FIG. 7 for the additional purpose of transmitting and receiving signals over the airwaves. A person (not shown) holding a remote 164 would then receive a bi-directional transmission link 162 using infrared, ultrasonic, and/or radio frequency signals from the hanging apparatus 1 in FIG. 1 or the pole mounted apparatus 2 in FIG. 7. The remote 164 would then process these signals and announce, using either visual and/or audio cues, to the person that something is on their feeder. The person then has the flexibility to decide if they want to rotate the feeder at a fast variable speed making the rodent uncomfortable and want to jump off. Or the person could decide to rotate the feeder at a slow speed turning the feeder until the birds can be easily seen. Also, the person now has the flexibility to reprogram the transmitter/receiver unit 150 on the fly to, for example, not rotate automatically but wait until a signal is sent. Or the transmitter/receiver unit 150 could be reprogrammed to automatically rotate the feeders but only for rodents and not for birds thus conserving crucial battery power. The remote 164 could send non-directional radio frequency signals or, since people would likely be pointing the remote at the feeder anyway, the remote 164 could use infrared signals to transmit the bi-directional transmission link 162 back to the hanging apparatus 1 in FIG. 1 or the pole mounted apparatus 2 in FIG. 7.

The transmitter/receiver unit 150 is activated, as before, when birds 91 or top squirrel 83 or bottom squirrel 87 approaches and/or touches the attached birdfeeder 89 or birdhouse as shown in FIG. 1 and FIG. 7. A load cell circuit 152 and a buzzer circuit 154 are similar to components previously mentioned and used in the FIG 4 and FIG 5 circuits. The output signals from these sensor circuits go to a receiver/transmitter microcontroller 159 which is similar to the microcontroller 51 in FIG. 4 and FIG. 5. However, additional algorithms now decide whether or not to activate the transmitter/receiver circuit 160. If activated, the bi-directional transmission link 162 is sent over the airwaves to a receiver/transmitter circuit 184 contained within the remote 164 for the purpose of notifying the bird watcher that there is something in their bird feeder or bird house. A DIP switch 158 is used by encoding/decoding algorithms inside the receiver/transmitter microcontroller 159 to encode a certain number of address bits into the bi-directional transmission link 162 through the transmitter/receiver circuit 160 similar to a standard garage door opener. The transmitter components used in the transmitter/receiver circuit 160 can be single or multiple light emitting diodes for an infrared mode of data transmission or an ultrasonic transducer for an ultrasonic mode of data transmission. Or the components can be a SAW-based transmitter module for a radio frequency-type bi-directional transmission link 162. Likewise, the components used at the receiving end of the bi-directional transmission link 162, the remote receiver/transmitter circuit 184, can be photo diodes to implement an infrared version of the bi-directional transmission link 162 or an ultrasonic transducer to implement an ultrasonic version of the bi-directional transmission link 162. Or the components can be a SAW-based receiver module for a radio frequency-type bi-directional transmission link 162. The TTL and/or CMOS compatible output of the remote receiver/transmitter circuit 184 is then sent to a remote microcontroller chip 182 which runs firmware algorithms that process the incoming signals. Chips from the Microchip PIC16C5X series can be utilized as suitable remote microcontroller 182 chips. A remote DIP switch 180 is identical to the one in the transmitter/receiver unit 150. The remote microcontroller chip 182 compares the address information received from the bi-directional transmission link 162 with the settings of the remote DIP switch 180. If there is a match in the decoded address bits, several outputs from the remote microcontroller chip 182 are then used to activate one or more devices. For example a remote buzzer 166 could be used to emit audio beeps or a purality of light emitting diodes 168 and/or a liquid crystal display circuit 170 could be used to produce visual cues to the user. Also, a serial port circuit 174 could be used to interface with a desktop personal computer (not shown). All or these examples are for the main purpose of notifying the bird watcher that a rodent or a bird is in their bird feeder or birdhouse. However, data from the serial port circuit 174 could also be used to activate other external devices such as cameras (not shown) for the purpose of taking pictures of birds and/or rodents in a bird feeder, or birdhouse. In addition, multiple transmitter/receiver units 150 attached to a multitude of bird feeders and/or bird houses can be used with a single remote 164 by virtue of unique address/data transmission information encoded into each bi-directional transmission link 162 sent to the remote 164. Part of the address/data information can also be utilized to tell which bird feeder, or bird house, is activated by observing the information presented to the bird watcher by the liquid crystal display circuit 170.

After being notified by the remote 164, the bird watcher then has the option to scare the rodents and/or unwanted birds away from their bird feeder, or bird house, simply by activating a loud and annoying audio and/or ultrasonic buzzers contained in the buzzer circuit 154 in the transmitter/receiver unit 150. The person could also decide to rotate the feeder at a fast speed making any rodents uncomfortable and want to jump off. Or the person could decide to rotate the feeder at a slow speed turning the feeder until the birds can be easily seen. The bird watcher can accomplish any of these tasks simply by pushing various buttons on a keypad 172 whose output goes to the remote microcontroller chip 182. The remote microcontroller chip 182 then interprets what the user wants to accomplish and creates a special address/data word using the current settings of the remote DIP switch 180. The results of which are then sent to the remote receiver/transmitter circuit 184 which, in turn, generates the bi-directional transmission link 162 back to the transmitter/receiver circuit 160 in the transmitter/receiver unit 150. The transmitter components used in the remote receiver/transmitter circuit 184 can be light emitting diodes for infrared modes of data transmission or an ultrasonic transducer for an ultrasonic modes of data transmission. Or the components can be as complex as a SAW-based transmitter module for a radio frequency-type of bi-directional transmission link 162. However, the situation is now somewhat simplified if the user is standing by the window. Consequently, the transmission link can now be infrared since the bird watcher now points the remote 164, much like a TV remote, at the bird feeder, or bird house, in order to activate various mechanisms. The benefits of using infrared can be seen in the manufacturing costs. The transmitter/receiver circuit 160 then strips digital data information out of the received carrier signal and sends the resultant TTL or CMOS compatible signal to the receiver/transmitter microcontroller 159 chip. The receiver/transmitter microcontroller 159 will then activate either the buzzer circuit 154, whose purpose is to scare away animals and/or a motor/gearbox 156 whose purpose is twofold; (1) to rotate the attached hanging bird feeder, or bird house, very slow for the purpose of reaching a better viewing position of the birds or (2) to rotate the attached hanging bird feeder, or bird house, at a variably fast speed for the purpose of repelling unwanted animals.

There are several versions of the previously discussed circuits and mechanical parts and configurations that were not disclosed. For example, a three-position switch could have been used in place of the switch 16 in FIG. 4 and FIG. 5 to connect directly to the microcontroller 51. The feature could then allow the user not have the motor/gearbox 11 be activated when birds 91 land on the feeder 89 in FIG. 1 or FIG. 7. The result of this will conserve valuable battery power for the main purpose of deterring rodents from the feeders 89. Another example is to use 180 mercury tilt switches attached to the printed circuit board 8 in FIG. 2 to detect when the hanging apparatus 1 in FIG. 1 was being tilted in any direction. Another example is a frequency-varying ultrasonic speaker system that transmits ultrasonic noise mainly in the rodent's hearing range and not in the bird's hearing range. Another example is an extra motor that is physically bolted internally to the hanging apparatus 1 in FIG. 1 and the pole-mounted apparatus 2 in FIG. 7 that has an offset-cam attached to its shaft that is free to rotate. The cam would, when activated, emit mechanical vibrations though out the invention itself and the feeders 89 shown in FIG. 1 and FIG. 7. The same example could also be configured having the offset cam replace with a ball chain that would beat against the inside wall of the hanging apparatus 1 in FIG. 1 and the pole-mounted apparatus 2 in FIG. 7. Another example is to use solar cells in place of the batteries 27 in FIG. 4 and FIG. 5 which would be mounted to the outside of the hanging apparatus 1 in FIG. 1 and the pole-mounted apparatus 2 in FIG. 7. This would eliminate the need for the chemical batteries 27 shown in FIG. 4 and FIG. 5. Another example is to use an alternating current power source from any standard household outlet with the proper rectifying circuitry added to the electronics inside the hanging apparatus 1 in FIG. 1 and the pole-mounted apparatus 2 in FIG. 7. Another example is to have the hanging apparatus 1 in FIG. 1 and the pole-mounted apparatus 2 in FIG. 7 both incorporated inside the feeder 89 or house. Specifically, the avian enclosures would be manufactured with all of the necessary electronic and mechanical components contained inside the enclosure. Note that most of the above examples could have incorporated some or all of the electronic and mechanical parts on the same printed circuit board 8 shown in FIG. 2. In closing, for all of these examples, and the many others not mentioned, it shall be assumed that these versions become obvious to anyone skilled in the art and who understands the embodiments of this document.

I claim:

1. An apparatus for attaching to an avian enclosure comprising:
   a housing;
   a motor coupled to said housing;
   at least one animal sensing mechanism that detects an animal and determines whether the animal is of a first type or a second type;
   a controller contained within said housing and coupled to said motor, said controller in communication with said at least one animal sensing mechanism, said controller causing said motor to run at a first speed when said animal is of said first type, said controller causing said motor to run at a second speed when said animal is of said second type.

2. An apparatus for attaching to an avian enclosure according to claim 1, further comprising a hook shaped shaft coupling said motor to said avian enclosure such that said avian enclosure is suspended beneath said housing.

3. An apparatus for attaching to an avian enclosure according to claim 1, wherein said avian enclosure is pole mounted, and said housing is positioned between said avian enclosure and said pole.

4. An apparatus for attaching to an avian enclosure according to claim 1, wherein said first speed is tolerable to said animal when said animal is of said first type, and wherein said second speed is intolerable to said animal when said animal is of said second type.

5. An apparatus for attaching to an avian enclosure according to claim 1, wherein said at least one animal sensing mechanism detects the presence of said animal prior to said animal contacting said avian enclosure.

6. An apparatus for attaching to an avian enclosure according to claim 1, wherein said motor rotates said avian enclosure for at least one minute.

7. An apparatus for attaching to an avian enclosure according to claim 1, wherein said at least one animal sensing mechanism comprises a vibration sensing mechanism.

8. An apparatus for attaching to an avian enclosure according to claim 1, wherein said at least one animal sensing mechanism comprises a load cell generally aligned with a sensing axis and positioned within said housing proximate to a point of flexation.

9. An apparatus for attaching to an avian enclosure according to claim 1, wherein said at least one animal sensing mechanism comprises a force sensitive resistor.

10. An apparatus for attaching to an avian enclosure according to claim 1, wherein said controller comprises a microcontroller.

11. An apparatus for attaching to an avian enclosure according to claim 1, wherein said at least one animal sensing mechanism senses changes in weight applied to said housing.

12. An apparatus for attaching to an avian enclosure according to claim 1, wherein said motor comprises a variable speed motor, and said controller further comprises a pulse width generator for selectively varying the rotational speed of said motor.

13. An apparatus for attaching to an avian enclosure according to claim 1, wherein said at least one animal sensing mechanism comprises a sensor that detects and measures static and differential loads applied thereto.

14. An apparatus for attaching to an avian enclosure according to claim 1, further comprising a sounding device coupled to said controller, said sounding device controllable to emit at least one sound to repel unwanted animals from said avian enclosure.

15. An apparatus for attaching to an avian enclosure according to claim 1, further comprising a remote control device that communicates with said controller to selectively cause said motor to rotate at the first and second speeds.

16. An apparatus for attaching to an avian enclosure according to claim 15, wherein said remote control device further comprises a keypad that activates and controls the speed of said motor from a distance.

17. An apparatus for attaching to an avian enclosure according to claim 1, wherein the first type of animal comprises a bird and the second type of animal comprises a rodent.

18. An apparatus for attaching to an avian enclosure according to claim 1, wherein the first type of animal comprises a small bird and the second type of animal comprises a large bird.

19. An apparatus for attaching to an avian enclosure according to claim 15, wherein said remote control device further comprises a control to activate a sounding device mounted within said housing and electrically connected to said controller.

20. An apparatus for attaching to an avian enclosure comprising:
  a housing coupled to said avian enclosure;
  a motor arranged to rotate said avian enclosure;
  a controller contained within said housing and coupled to said motor;
  a load cell coupled to said controller, said load cell generally aligned with a sensing axis and positioned within said housing proximate to a point of flexation, wherein said controller causes said motor to rotate said avian enclosure when said load cell detects the presence of an animal, said motor rotating said avian enclosure at a first speed when said animal is of a first type, and said motor rotating said avian enclosure at a second speed when said animal is of a second type.

21. An apparatus for attaching to an avian enclosure according to claim 20, wherein the second type of animal weighs more than the first type of animal, the load cell distinguishing between the first type and the second type according to sensed weight.

22. An avian enclosure comprising:
  an avian structure;
  a motor coupled to said avian structure;
  at least one animal sensing mechanism that detects an animal and determines whether the animal is of a first type or a second type;
  a controller contained within said avian structure and coupled to said motor, said controller in communication with said at least one animal sensing mechanism, said controller causing said motor to rotate said avian structure at a first speed when said animal is of said first type, said controller causing said motor to rotate said avian structure at a second speed when said animal is of said second type.

23. An avian enclosure according to claim 22, wherein said first speed is tolerable to said animal when said animal is of said first type, and wherein said second speed is intolerable to said animal when said animal is of said second type.

24. An avian enclosure according to claim 22, wherein said at least one animal sensing mechanism detects the presence of said animal prior to said animal contacting said avian structure.

25. An avian enclosure according to claim 22, wherein said motor rotates said avian structure for at least one minute.

26. An avian enclosure according to claim 22, wherein said at least one animal sensing mechanism comprises a vibration sensing mechanism.

27. An avian enclosure according to claim 22, wherein said at least one animal sensing mechanism comprises a load cell generally aligned with a sensing axis and positioned within said housing proximate to a point of flexation.

28. An avian enclosure according to claim 22, wherein said at least one animal sensing mechanism comprises a force sensitive resistor.

29. An avian enclosure according to claim 22, wherein said controller comprises a microcontroller.

30. An avian enclosure according to claim 22, wherein said at least one animal sensing mechanism senses changes in weight applied to said avian structure.

31. An avian enclosure according to claim 22, wherein said motor comprises a variable speed motor, and said controller further comprises a pulse width generator for selectively varying the rotational speed of said motor.

32. An avian enclosure according to claim 22, wherein said at least one animal sensing mechanism comprises a sensor that detects and measures static and differential loads applied thereto.

33. An avian enclosure according to claim 22, further comprising a sounding device coupled to said controller, said sounding device controllable to emit at least one sound to repel unwanted animals from said avian enclosure.

34. An avian enclosure according to claim 22, further comprising a remote control device that communicates with said controller to selectively cause said motor to rotate at the first and second speeds.

35. An avian enclosure according to claim 34, wherein said remote control device further comprises a keypad that activates and controls the speed of said motor from a distance.

36. An avian enclosure according to claim 34, wherein said remote control device further comprises a control to activate a sounding device mounted within said housing and electrically connected to said controller.

37. An avian enclosure according to claim 33, wherein the first type of animal comprises a bird and the second type of animal comprises a rodent.

38. An avian enclosure according to claim 22, wherein the first type of animal comprises a small bird and the second type of animal comprises a large bird.

39. An avian enclosure comprising:

an avian structure;

a motor arranged to rotate said avian structure;

a controller contained within said avian structure and coupled to said motor;

a load cell coupled to said controller, said load cell generally aligned with a sensing axis and positioned within said housing proximate to a point of flexation, wherein said controller causes said motor to rotate said avian structure when said load cell detects the presence of an animal, said motor rotating said avian structure at a first speed when said animal is of a first type, and said motor rotating said avian structure at a second speed when said animal is of a second type.

40. An avian enclosure according to claim 39, wherein the second type of animal weighs more than the first type of animal, the load cell distinguishing between the first type and the second type according to sensed weight.

41. A combination apparatus and avian enclosure comprising:

the avian enclosure;

an apparatus coupled to the avian enclosure in a manner that allows the apparatus to rotate the avian enclosure with respect to the apparatus, the apparatus comprising:

a housing;

a motor coupled to said housing, the motor having a shaft coupled to the avian enclosure, the rotation of the shaft causing rotation of the avian enclosure;

at least one animal sensing mechanism that detects an animal and determines whether the animal is of a first type or a second type; and a controller contained within said housing and coupled to said motor, said controller in communication with said at least one animal sensing mechanism, said controller causing said motor to rotate said avian enclosure at a first speed when said animal is of said first type, said controller causing said motor to rotate aid avian enclosure at a second speed when said animal is of said second type.

* * * * *